(12) United States Patent
Keys

(10) Patent No.: US 6,214,267 B1
(45) Date of Patent: Apr. 10, 2001

(54) EXTRUSION WITH VARIABLE NEUTRAL AXIS WIRE CORE

(75) Inventor: James Frederick Keys, St. Neots (GB)

(73) Assignee: The Standard Products Company, Cleveland, OH (US)

( * ) Notice: Subject to any disclaimer, the term of this patent is extended or adjusted under 35 U.S.C. 154(b) by 0 days.

(21) Appl. No.: 09/074,296

(22) Filed: May 7, 1998

(51) Int. Cl.[7] .................................................. B29C 47/02
(52) U.S. Cl. .............................. 264/171.16; 264/171.26; 428/358
(58) Field of Search .................. 264/171.13, 171.14, 264/171.15, 171.16, 171.26, 172.1, 235.6; 428/122, 358

(56) References Cited

U.S. PATENT DOCUMENTS

| | | | |
|---|---|---|---|
| 2,574,124 | 11/1951 | Schlegel | 20/69 |
| 3,124,851 | 3/1964 | Straight et al. | 20/69 |
| 3,198,689 | 8/1965 | Lansing | 161/100 |
| 3,430,387 | 3/1969 | Clapham | 49/491 |
| 4,151,237 | * 4/1979 | Ney | 264/40.7 |
| 4,270,792 | 6/1981 | Mathieson et al. | 296/93 |
| 4,343,845 | 8/1982 | Burden et al. | 428/122 |
| 4,413,033 | 11/1983 | Weichman | 428/122 |
| 4,517,233 | 5/1985 | Weichman | 428/108 |
| 4,624,093 | 11/1986 | Gibson | 52/716 |
| 4,934,100 | * 6/1990 | Adell | 49/462 |
| 5,006,291 | * 4/1991 | Fish | 264/103 |
| 5,009,947 | 4/1991 | McManus et al. | 428/122 |
| 5,143,666 | 9/1992 | McManus et al. | 264/26 |
| 5,416,961 | 5/1995 | Vinay | 28/165 |
| 5,783,125 | * 7/1998 | Bastone et al. | 264/45.3 |

FOREIGN PATENT DOCUMENTS 1012759  12/1965  (GB) .

* cited by examiner

*Primary Examiner*—Jan H. Silbaugh
*Assistant Examiner*—Mark Eashoo

(57) ABSTRACT

An elongated extruded strip with a wire core having a selectively positioned neutral bending axis is made by coextruding an elastomeric extrudate at an elevated temperature about a wire core having adjacent parallel transverse wire lengths joined by low temperature threads having a melting point lower than the said elevated temperature while simultaneously feeding at least one high temperature thread into the extruder in bonding relationship to the elastomeric extrudate and in selected position therewith.

15 Claims, 1 Drawing Sheet

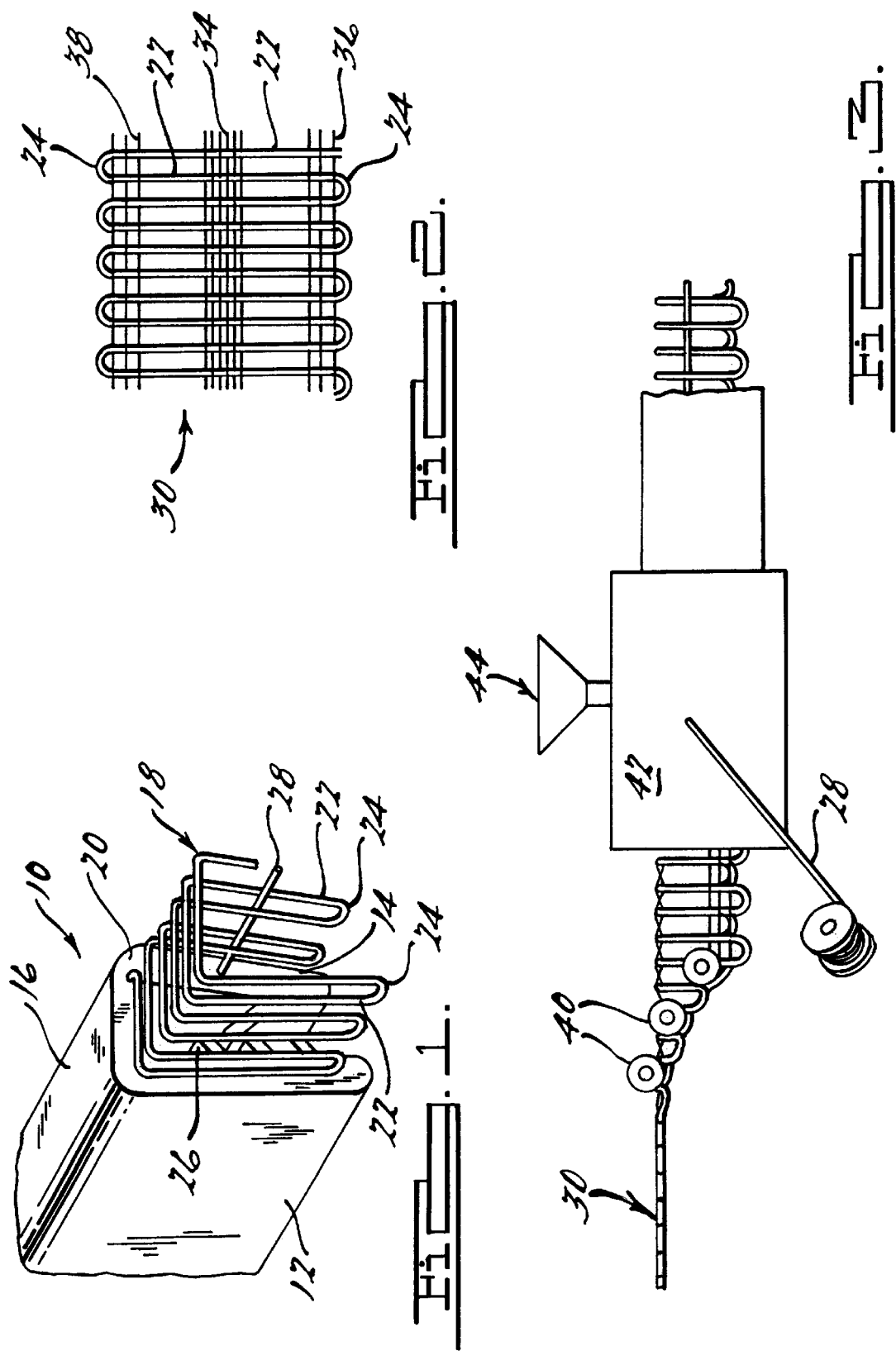

EXTRUSION WITH VARIABLE NEUTRAL AXIS WIRE CORE

FIELD OF THE INVENTION

The present invention relates to an elastomeric extrusion having a wire core reinforcement. More particularly, the present invention relates to extruded elastomeric strips which are generally U-shaped in cross-section and which are well adapted for gripping and covering the edges of flanges around doors of automotive vehicles and which often carry a sealing or decorative member.

BACKGROUND OF THE INVENTION

U-shaped extruded elastomeric strips are in general use in the manufacture of automotive vehicles for sealing and decorative purposes. While it will be appreciated that such strips have many uses, such as in the appliance industry, the present invention will be described in the context of the automobile industry where such strips are commonly used to cover flanges which extend around various openings such as are found around doors, trunks and the like. The strips can simply cover the flange, or in many cases, cover the flange and also carry another member such as a sealing member bulb or a fin to cover an associated gap running along the flange.

Generally speaking, the extrusions are made by extruding an elastomeric material about a metallic core which serves to reinforce the legs of the U-shaped extrusion so that the extrusion will effectively secure to an associated flange with sufficient clamping force. Some cores are stamped or lanced from a metal sheet. Other cores are made by winding a wire in surpentine fashion. The present invention especially relates to extrusions made using the wire type of core. Wire core based extrusions are well-suited to provide clamping force in a direction transverse to the extrusion but require additional tensile strength in the longitudinal direction, particularly during the extrusion process when the elastomeric material is not yet cured. The conventional exrusion process involves first extruding the elastomeric material about the core and then pulling the elongated extrudate by primary puller rolls or belts for cooling and further processing steps. Satisfactory extrusion requires that the extruded strip maintain a neutral geometry in the extruder and have tensile strength along its longitudinal axis in order to allow pulling of the strip through curing and cooling steps after the extruder.

One method of providing tensile strength to wire cores is to employ warp threads to knittingly hold adjacent parallel transverse wire segments in spaced relationship. This method deals with the processing limitations imposed by lack of tensile strength but introduces a problem when the extruded strip is applied to the usual curved flange. Flange edges commonly extend around the periphery of openings and are curved. It has been found that application of extrusions with threads rigidly holding the wire core in spaced relationship to a curved flange results in a bending axis which twists an associated seal or fin out of alignment if the extrusion has a neutral geometry. Thus, it has been found desirable to provide some flexibility in the wire to provide the extrusion with assymetric geometry to accommodate use of the extrusion on a curved flange edge.

One method of providing additional support to metal wire core is taught in U.S. Pat. No. 5,416,961 Jan. 26, 1994, to Vinay. The Vinay patent teaches a knitted wire core for use in the manufacture of weather seals comprising, a wire folded into a zigzag configuration for carrying a plurality of polymeric warp threads knitted on the wire and at least one meltable filament laid into at least two adjacent warp threads, whereby on heating, the melted filament causes the at least two adjacent warp threads to be bonded to the wire and/or to each other.

Another patent relating to support frames having longitudinally displaceable frame portions that are reinforced with longitudinally extending degradable reinforcing material is U.S. Pat. No. 5,143,666 Sep. 1, 1992 to McManus et al. The McManus patent involves advancing a reinforced support frame through an extrusion die where a coating of an elastomeric material is extruded on the support frame to form an elastomeric strip without degrading the degradable material. Then, longitudinally-spaced regions of the degradable reinforcing material corresponding to the longitudinally-spaced curved sections of the flange are then degraded, allowing the elastomeric strip to more faithfully follow the curved sections of the flange when the strip is mounted thereon. See also U.S. Pat. No. 5,009,947 Apr. 23, 1991, to McManus et al.

U.S. Pat. No. 4,343,845 Aug. 10, 1982, to Burden et al relates to an elastomeric strip which has a support frame having selected regions of longitudinally displaceable frame portions such as wire loops reinforced by degraded and nondegraded materials that are nondegradable during the frame coating operation for inhibiting longitudinal displacement of the frame portions during the frame coating operation. The degraded material breaks down when the strip is flexed to allow increased flexibility of the strip and the nondegraded material prevents undue elongation or stretching of the strip.

In summary, the manufacture of elastomeric extrusions having wire cores encounter certain difficulties. The neutral geometry of the core must be maintained while it travels through the extruder. After the extrusion leaves the die, it must be provided with sufficient tensile strength to allow pulling through the curing and cooling steps. Furthermore, when applied to a curved flange of a vehicle, the strip must have asymetric geometry to allow bending of the strip around relatively small radius curves.

These issues are addressed by the present invention which provides a variable neutral axis wire core employing relatively low temperature and relatively high temperature threads. Further understanding of the present invention will be had from the accompanying drawings and following disclosure.

SUMMARY OF THE INVENTION

An elongated extruded strip with a wire core having a selectively positioned neutral bending axis is made by extruding an elastomeric extrudate at an elevated temperature about a wire core having adjacent parallel transverse wire lengths joined by low temperature threads having a melting point lower than the said elevated temperature while simultaneously feeding at least one high temperature thread into the extruder in bonding relationship to the elastomeric extrudate and in selected position therewith.

BRIEF DESCRIPTION OF THE DRAWINGS

FIG. 1 shows a preferred embodiment of the present invention in perspective and in partial section and broken away;

FIG. 2 shows a plan view of a flat wire core with low temperature threads knitted to the wire and which is suitable for use in the method of making the present invention; and FIG. 3 is a schematic view illustrating a preferred process of the present invention.

DESCRIPTION OF THE INVENTION

Now referring to FIG. 1, a preferred embodiment of the present invention is illustrated and indicated generally by the numeral 10. Extruded strip 10 is U-shaped in cross section with a pair of legs 12 and 14 joined by a web 16. Strip 10 comprises a U-shaped wire core 18 with elastomeric cover 20 extruded thereabout. Preferred material for elastomeric core 20 is selected from the group consisting of EPDM rubber, polyvinylchloride and thermoplastic rubber. Wire core 18 has transversely extending lengths 22 bent into a generally U-shape and with lengths joined at opposite ends by bights 24. Elastomeric cover 20 has gripping ribs 26 for secure retention of strip 10 onto a flange as is conventional in the art. A high temperature thread 28 extends longitudinally through cover 20 and is in bonding relationship therewith.

Now referring to FIG. 2, a core used in the process for making strip 10 is illustrated. A conventional flat wire core is indicated generally by the numeral 30 and is the type of core to be used as starting material in the process of the present invention. Wire core 30, with transversely extending lengths 22 joined by bights 24, has low temperature threads 34 extending longitudinally in the central portion thereof. Also, further low temperature threads 36 and 38 extend longitudinally along the edges of wire core 30 near bights 24. The low temperature threads 34, 36 and 38 are attached to the associated lengths of wire core 30 by knitting or other conventional means. The term "low temperature threads" is intended to mean that the threads, which are preferably made of a polymeric material such as polyester, have a melting point which is lower than the temperature to which they will be subjected in the extruder, i.e., the temperature at which the elastomeric material will have when extruded thereover. Suitable low temperature yarns may, for example, be polyester yarns which soften at a temperature between about 145 degrees Centegrade and about 160 degrees Centegrade and which melt at between about 160 degrees Centegrade and about 170 degrees Centegrade. It will be appreciated by those skilled in the art that the particular temperatures are dependent upon the temperatures of the extrudate and are functionally determined.

Now referring to FIG. 3, the process of the present invention is illustrated in somewhat schematic form with steps occurring as viewed from left to right. First, wire core 30, is fed through forming rolls 40 which bend core 30 into the desired U-shape as is conventional in the art. Then, now U-shaped wire core 30 is fed into extruder 42. Elastomeric material, rubber is extruded about core 30 to form an elastomeric cover 20 in a generally conventional manner except that a high temperature thread 28 is also fed into the extruder just before the elastomeric material 44. High temperature thread 28 is positioned with respect to core 30 in a selected manner to achieve the desired neutral bending axis.

In extruder 42, the low temperature threads 34, 36 and 38 at first provide tensile support to core 30 in the longitudinal direction. However, when elastomeric material 44 comes in contact with the threads they are heated thereby which results first in softening and then in melting of the threads. Threads 34, 36 and 38 thus provide tensile strength at first in the extruder to help maintain the neutral geometry of the core, but then melt and are of no further use at which time the transverse lengths 22 of core 30 would be free to move longitudinally. However, at least one high temperature thread 28 is fed into the extruder just before the elastomeric material. Suitable high temperature threads 28 are those threads which will not lose their strength at the processing temperatures encountered in the extrusion process. Suitable high temperature threads 28 may comprise polyamide or glass fiber material or metal. An adhesion coating may be used to enhance the bond between the high temperature thread and the elastomeric material 44. High temperature thread 28 is positioned with respect to core 30 in selected fashion to provide the desired neutral bending axis of the final product. In the preferred embodiment shown in FIG. 1, high temperature thread 28 is positioned generally medially on leg 14. However, high temperature thread 28 can be selectively positioned to obtain a desired neutral bending axis and more than one thread 28 can be employed. For example, a high temperature thread 28 could be positioned along web 16 as well as along either leg 14 or 12. High temperature thread 28 further provides the tensile strength required to pull the strip through the extruder.

While a specific preferred embodiment of the present invention has been described above, it will be appreciated that the invention is subject to modification and variation and such modifications and variations are intended to be included within the fair scope of the following claims.

What is claimed is:

1. A method of making an extruded strip having a cross-sectional U-shape with a pair of legs joined by a web, the method comprising the steps of:

(A) extruding an elastomeric material about a wire core in an extruder, said core having transversely extending, parallel wire lengths only joined at alternating ends with bights in a continuous serpentine manner, said wire lengths joined in a longitudinal direction by low temperature threads;

(B) feeding a high temperature thread into said extruder just upstream of said elastomeric material and positioning said high temperature thread to selectively determine a neutral bending axis of said strip; and (C) pulling said strip from said extruder; said elastomeric material having a temperature in said extruder which is higher than the melting temperature of said low temperature threads and lower than the melting temperature of said high temperature thread, wherein said elastomeric material contacts said low temperature threads thereby first softening and then melting said low temperature threads.

2. The method of claim 1, wherein said high temperature thread is positioned along a leg portion of said strip.

3. The method of claim 1, wherein said high temperature thread is positioned along the web portion of said strip.

4. The method of claim 1, wherein said elastomeric material is EPDM and said high temperature thread comprises polyamide.

5. The method of claim 1, wherein said elastomeric material is EPDM and said high temperature thread comprises glass fiber.

6. The method of claim 1, wherein said low temperature threads have a melting temperature of from about 160 degrees Centegrade to about 170 degrees Centegrade.

7. The method of claim 6, wherein said high temperature thread has a melting temperature of greater than 250 degrees Centegrade.

8. The method of claim 1, wherein said high temperature thread includes a bonding agent thereon.

9. A method of making an extruded strip having a cross-sectional U-shape with a pair of legs joined by a web, the method comprising the steps of:

(A) extruding an elastomeric material about a wire core in an extruder, said core having transversely extending, parallel wire lengths only joined at alternating ends with bights in a continuous serpentine manner, said wire lengths joined in a longitudinal direction by low temperature threads;

(B) feeding a plurality of high temperature threads into said extruder just upstream of said elastomeric material and positioning said high temperature threads to selectively determine a neutral bending axis of said strip; and (C) pulling said strip from said extruder; said elastomeric material having a temperature in a said extruder which is higher than the melting temperature of said low temperature threads and lower than the melting temperature of said high temperature threads, wherein said elastomeric material contacts said low temperature threads thereby first softening and then melting said low temperature threads.

10. The method of claim 9, wherein said high temperature threads are positioned along a leg portion of said strip.

11. The method of claim 9, wherein said high temperature threads are positioned along the web portion of said strip.

12. The method of claim 9, wherein at least one of said high temperature threads is positioned along a leg of said strip and at least one said high temperature threads is positioned along the web of said strip.

13. The method of claim 9, wherein said low temperature threads have a melting temperature of from about 160 degrees Centigrade to about 170 degrees Centigrade.

14. The method of claim 13, wherein said high temperature threads have a melting temperature of greater than 250 degrees Centigrade.

15. The method of claim 9, wherein said high temperature threads include a bonding agent thereon.

* * * * *